(12) United States Patent
Schopf, Jr.

(10) Patent No.: US 7,896,959 B1
(45) Date of Patent: Mar. 1, 2011

(54) FILTRATION APPARATUS

(76) Inventor: Robert W. Schopf, Jr., Doylestown, PA (US)

(*) Notice: Subject to any disclaimer, the term of this patent is extended or adjusted under 35 U.S.C. 154(b) by 308 days.

(21) Appl. No.: 12/214,870

(22) Filed: Jun. 23, 2008

Related U.S. Application Data

(63) Continuation-in-part of application No. 11/119,254, filed on Apr. 29, 2005, now Pat. No. 7,390,340.

(51) Int. Cl.
 *B01D 49/00* (2006.01)
(52) U.S. Cl. .............. 96/417; 96/421; 55/288; 55/350.1; 55/DIG. 34; 210/340
(58) Field of Classification Search ............. 55/283, 55/288, 350.1, 385.1, DIG. 34; 96/417, 421; 210/340, 341
See application file for complete search history.

(56) References Cited

U.S. PATENT DOCUMENTS

| | | | | |
|---|---|---|---|---|
| 4,923,068 A | * | 5/1990 | Crowson | 210/741 |
| 5,085,049 A | * | 2/1992 | Rim et al. | 60/274 |
| 6,090,187 A | * | 7/2000 | Kumagai | 95/278 |

* cited by examiner

*Primary Examiner*—Robert A Hopkins
(74) *Attorney, Agent, or Firm*—John Lezdey

(57) ABSTRACT

A filtration apparatus for use in a system containing a gas or liquid to be decontaminated. The apparatus has at least one housing for a filter that removes contaminants from a gas or liquid which include biologics and chemicals. The housing contains an inlet portion and an outlet portion in association with valves for closing or regulating the flow of gas or liquid to be decontaminated by the filter. A differential pressure gauge is optionally provided to monitor the pressure in the housing and to indicate when the filter should be replaced. One or more housings can be used for the apparatus. The apparatus is useful for securing water systems, gas delivery systems, and vacuum systems.

14 Claims, 1 Drawing Sheet

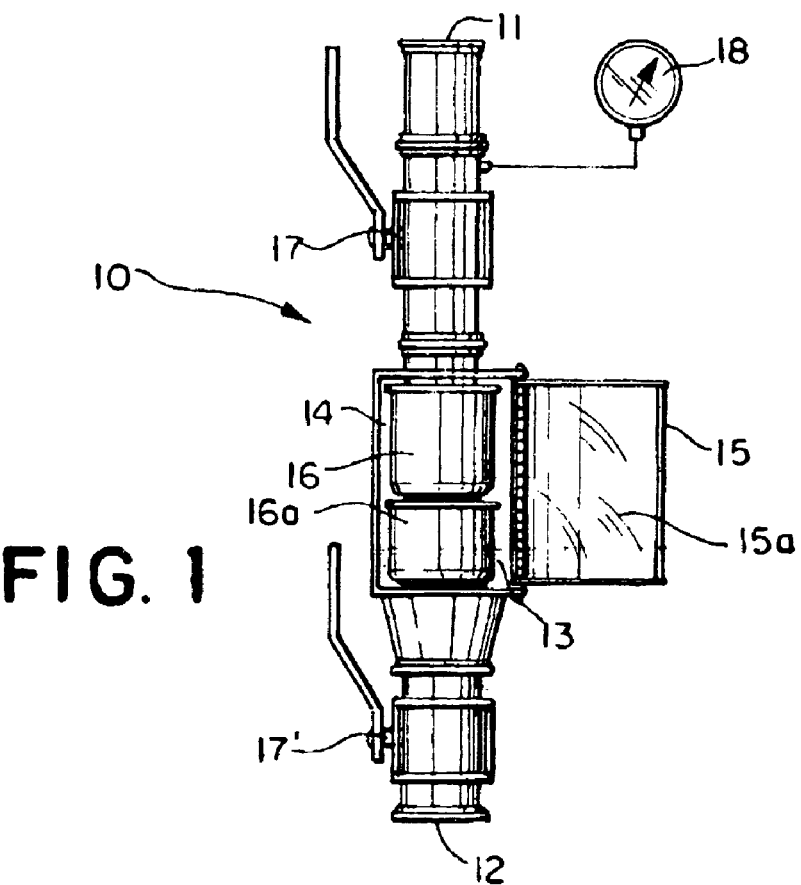
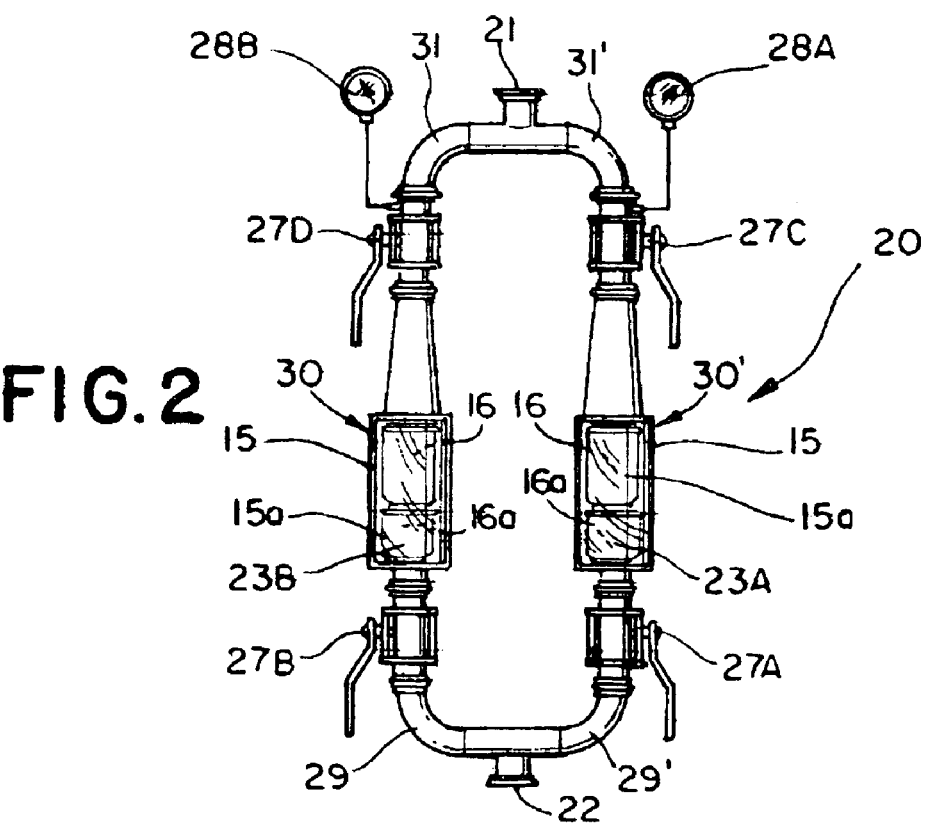

FILTRATION APPARATUS

RELATED APPLICATIONS

This application is a continuation-in-part of application Ser. No. 11/119,254 filed Apr. 29, 2005 U.S. Pat. No. 7,390,340.

FIELD OF THE INVENTION

The present invention relates to a fluid filtering device. More particularly, the filtering device filters undesirable chemicals, particles, hydrocarbons, pathogens and the like from liquids, gases, vapors and the like which can be easily maintained.

BACKGROUND OF THE INVENTION

It is not only desirable to protect the environment from debris, particulates, contaminants, biologics, bacteria, chemicals and other airborne material which are produced in industrial plants but to provide similar protection in systems which have a fluid flow that are used in hospital anesthesia systems, plumbing and water delivery systems in buildings and municipalities.

Filtration devices in a plumbing system are used for the water delivery system. However, the prior art devices are difficult to install in existing system and once installed are difficult to maintain. Furthermore, they may require security against contamination.

Hospitals utilize a central location for gases used in delivery to patients in their rooms or in the operating rooms. A problem recognized in hospitals is that contaminants such as mold or pathogens are capable of growth in the delivery systems and require frequent inspection and cleaning. Such operation is not efficient and is costly. New Jersey at the present time is the only state which requires maintenance of any gas delivery system. It would be desirable to provide a system which can be easily installed that filters any undesirable matter found in the oxygen or anesthesia or any gas systems.

Water delivery systems should be provided with security means to delivery potable water in the event of accidental or deliberate contamination. This invention relates to a security filter system and/or arrangement that allows more efficient and reliable operation, permits more effective maintenance of the equipment, and also frequently provides installation of the equipment at a significantly lower cost, than have been possible with systems and arrangements previously proposed or used.

One problem with previously proposed multiple unit equipment is that the gas or liquid flow distribution frequently is not uniform either among the units or within the individual units themselves. As a consequence, one unit may be loaded beyond its efficiency while a companion unit receives only a part of its rated load.

Moreover, the arrangement of conduits in known multiple unit equipment is often such that poor gas distribution within the separate units causes uneven loading of the cleaning elements of the units and an accompanying deterioration in cleaning performance. In other words, the cross-sectional flow distribution within a given unit is not uniform, as it should be for optimum efficiency. Although a uniform cross-sectional distribution of the gas within a filter is essential to its efficient operation, it is difficult to achieve because of the relatively low gas velocity (on the order of five feet per second) at which filters are operated and do not secure against a contaminant entering the system.

Because of the threat of terrorists it has become necessary to secure water systems for buildings as well as for cities by installing biological filters which can trap and/or kill pathogens. Moreover, filters can be provided which can signal the presence of pathogens or chemicals by a change in color or other means.

SUMMARY OF THE INVENTION

The present invention provides for a security filtration means for use in removing contaminants such as particulates, pathogen, biologics and chemicals from a fluid system which comprises compressed gases or liquids which can be easily maintained, installed and prevent contamination.

In accordance with one embodiment of the invention there is provided a single filter unit for installation in a hospital system which provides a compressed gas such as oxygen or anesthesia to patients from a central location. Accordingly, the filtration unit comprises an inlet at one end and an outlet at the other end. A chamber is provided between the outlet and inlet which holds at least one replaceable filter. At least one valve is provided to stop the flow of gases to replace the filter. A pressure gauge in association with the chamber is optionally provided to show a change in pressure which indicates that the filter should be replaced.

In accordance with another embodiment of the invention, there is provided a security filtration system comprising multiple filter chambers having one or more filters having conduits with a common inlet and outlet for the gases or liquid entering and leaving the chambers. At the ends of each chamber is a valve means to close off the flow of gases or liquids into respective chambers. Each chamber is provided with at least one filter for removing selected contaminants. A pressure gauge is optionally associated with each chamber to show a loss in pressure to indicate the time to replace the filters. Each chamber can be selectively closed while the remaining opened chamber can be continued in operation and to maintain uniform distribution of gas or liquid. Alternatively, both chambers can be closed when there is a signal indicating a hazard.

It is an object of the invention to provide a filtration system with filter means which can be easily replaced and maintained.

It is another object of the invention to provide a means for filtering gases used in a hospital to treat patients.

It is another object of the invention to provide a filter system having a multiplicity of filters which clean gases or liquid and each filter can be shut down without it being necessary to shut down the entire system.

It is a further object of the invention to provide a filtration device for safeguarding the water supply to buildings onto a city.

It is yet another object of the invention to provide a filtration system having a multiplicity of different filters or indicators to detect and/or filter pathogens or hazardous chemicals.

The invention will be better understood by reference to the drawings and the description of the preferred embodiments. The drawings are exemplary only, and should not be construed as limiting the invention.

BRIEF DESCRIPTION OF THE DRAWINGS

FIG. 1 is a front view of a single unit filtration device used in a gas or liquid delivery system according to the invention.

FIG. 2 illustrates a multi-filtration unit according to the invention.

DESCRIPTION OF THE PREFERRED EMBODIMENTS

According to the present invention there is provided a security filtration device which can be easily maintained and used in fluid systems to remove contaminants such as chemicals, particles, pathogens, biologics and the like, from gases, vapors, liquids and the like. The devices can also be used to regulate the flow of fluids.

According to one embodiment of the invention, a single unit filtration device can be installed in a gas delivery system in a hospital or a laboratory. Oxygen and anesthesia and other gases are commonly delivered in a hospital under pressure from central areas to the patient and to the operating rooms by way of lines or pipes which when not in use can collect mold, debris, pathogens and the like, that can find their way to the patient. Similarly in laboratory experiments contaminants must be filtered out where gases are utilized. As seen in FIG. 1, a filtration device (10) can be installed in the system at a point prior to the gases reaching the patient. The filtration device (10) comprises a housing (13) with a chamber (14) in which at least one filter (16) is inserted. A second filter or indicator can be used which changes color to indicate chemicals or is a biologic filter for pathogen. The device (10) may have a door (15) with a window (15a) to observe color change or can comprise a removable housing (13) which can be removed to replace the filters. On the outlet (11) of the device (10) is a valve (17) which can shut down the fluid flow or regulate the pressure in the chamber. On the inlet (12) of the device is another valve ($17^1$) which can also be used to regulate the pressure of the fluid in the chamber to control the fluid flow. Each of the valves (17, $17^1$) can be closed when removing the filter (16) to prevent the contaminants from entering the system. A gauge (18) associated with the chamber can be used to monitor the fluid pressure and to indicate by a pressure drop when the filter is clogged and should be changed.

According to another embodiment of the invention there is provided a novel and improved multiple unit system or arrangement of separate filter units that affords substantially uniform gas distribution among the units. Balanced loading of the multiple unit system is thus achieved, and improved particulate removal efficiency accordingly obtained. The device and can also be inserted in buildings to secure the drinking water systems in the event of a terrorist attack. The improved system also enables any of such filter units to be isolated from the system and their enclosures to be opened to allow work to be performed, while permitting the source of gases or liquids being cleaned to remain in operation and affording effective cleaning during such maintenance or repair work. Moreover, the apparatus may be employed in a system carrying on any process involving the generation of gas or liquid contaminants that are removed by such filter units.

According to a further embodiment of the invention, there are provisions for the cleaning and sterilization of the filter element and housing prior to opening and or removal of the housing. This allows for the use of steam, chemical, gas or any other type of sanitation or decontamination of the filter and/or housing. These provisions could also be employed to the system as a whole, if required or needed.

More particularly, an apparatus of the invention comprises the multiplicity of separately enclosed filter units that are separately connected to a common chamber that receives the gas or liquid to be cleaned from one or more sources. If appropriate, the gases or liquids may be released from the individual filter units directly to the environment, or to other systems where they are used. Advantageously, however, the system is arranged such that the differential pressure across all of the filters is substantially equal so that the devices will share substantially equally the load of the gases or liquids being cleaned or decontaminated, thus ensuring uniform flow distribution among and within the several filters. An important advantage of the invention is thereby realized, inasmuch as optimum utilization of each filter unit with correspondingly increased decontamination effectiveness.

Each of the filter units is provided with an appropriate valve or valve-type device for selectively cutting off communication from the chamber to the gas source so that the filter unit (housing) may be separated from the system for maintenance, repair or any other reason without making it necessary to shut down the entire system or the equipment which it serves. Another important advantage of the apparatus, according to the invention, resides in this feature, namely, the ability of maintaining continuous operation of a gas-cleaning system while permitting one, and possibly two or more, gas-cleaning units to be shut down for maintenance or repair. Also, a malfunction in one cleaning unit of the system does not reduce the effectiveness of cleaning below an acceptable level.

As seen in FIG. 2, one of such multi-filter units comprises the device (20). The device (20) consists of a pair of parallel filter units (30, $30^1$). The units (30, $30^1$) have a common inlet (22) to which they are connected by lines or conduits, (29, $29^1$). There is a common outlet (21) to which the units (30, $30^1$) are connected by lines (31, $31^1$). Unit (30) comprises a housing (23B) with a chamber containing at least one filter (not shown) or biologic decontamination. At each end of the housing (23B) are valves (27B, 27D) which can be used to control the flow of gases or liquids and completely shut off the unit for maintenance or to remove the unit. Gauges (28A, 28B) may be associated with units (30, $30^1$) to monitor the pressure so as to have uniform flow or signal problems in the system.

At each end of the housing (23A, 23B) are valves (27A, 27C) for regulating the fluid flow. A gauge (28A) in line (31) monitors the pressure so as to have a uniform flow across the device (20).

Dependent upon the installation in which it is used, the device (20) can optionally contain cleaning and drain ports for cleaning in place. Also, cleaning can occur through the ports (21, 22) utilizing steam or chemicals.

Dependent on its use the housing and pipe lines or conduits may be constructed of different types of steel, bronze/copper, plastic materials such as Teflon, polyvinyl chloride, polypropylene and the like.

Any commercially available pressure differential gauge may be used such as a Delta-P gauge with an optional switch and/or an indicating device to signal contamination.

The multi-unit device may contain one type of filter or may contain two or more different types of filters arranged in series with each other. Each device will have filter arrangements in parallel in a system. Gas filters positioned and oriented in a symmetrical arrangement relative to the source from which they receive the gases, provides optimum conditions for uniform flow of gases and for even distribution to the filter units.

The device of FIG. 2 is suitable for use in connection with a water system in buildings or municipal facilities such as water treatment plants.

An advantage in having valve means at both the outlet and inlet is that uniform distribution of gas or liquids can continue when the housing in the multi-units are not spaced equidistant.

The filters can contain cationic, or anionic ion exchange material, charcoal, sand, biological filters or treating devices, HEPA filters, and the like depending upon the system to be filtered or treated. Filter media can be poly glass, membrane, PTFE membrane, or expanded PTFE membrane, activated charcoal bio-filters or any other available media depending on the use.

What is claimed is:

1. A biological filtration apparatus which decontaminates biologics or chemicals for use in a system containing a gas or liquid to be decontaminated which comprises:
   at least one housing having an inner chamber; an inlet and an outlet;
   at least one filter means in said at least one chamber for decontaminating the gas or liquid;
   an outlet portion for said apparatus for discharge of a decontaminated gas or liquid from said filter means and chamber associated with said at least one housing after decontamination;
   an inlet portion of said apparatus associated with an inlet of said at least one housing for receiving said gas or liquid to be passed through said chamber and filter means;
   first valve means associated with the inlet portion of said at least one housing to selectively close off the inlet to said at least one housing and to control the flow of said gas or liquid;
   second valve means associated with the outlet portion of said at least one housing to selectively close off the outlet of said at least one housing and to control the flow of said gas or liquid whereby any biologics or chemicals are decontaminated.

2. The filtration apparatus of claim 1 including a pressure differential gauge associated with said at least one housing.

3. The filtration apparatus of claim 1 wherein said filter means contains an indicator.

4. The filtration apparatus of claim 1 in which said housing contains a HEPA filter.

5. The filtration apparatus of claim 1 comprising a multiplicity of parallel housings, each housing having a chamber;
   a filter means in each chamber with at least one select filter for selective decontamination;
   each housing having an inlet for receiving a gas or liquid to be decontaminated and an outlet for discharging the gas or liquid after decontamination;
   said apparatus having an inlet at one end for receiving a gas or liquid to be decontaminated and an outlet at the other end for discharging the decontaminated liquid or gas;
   substantially identical outlet conduits communicating with the outlets of each of said housings and the outlet of said apparatus;
   valve means in each of said inlet conduits for selectively closing off said inlet conduit to preclude gas or liquid inflow to the respective chamber and to regulate the flow of gas or liquid into the respective chambers;
   valve means in each of said outlet conduits for selectively closing off said outlet conduit to preclude gas or liquid inflow so that the gas or vapor will be processed through the open chambers.

6. The filtration apparatus of claim 5 including a pressure differential gauge associated with each housing.

7. The filtration apparatus of claim 5 comprising two spaced apart parallel housings.

8. The filtration apparatus of claim 5 wherein the filter means includes a biological filter.

9. The filtration apparatus of claim 8 wherein said filter means includes an indicator.

10. A filtration apparatus for use in a system containing a gas or liquid having a biological or chemical to be decontaminated which comprises;
    a pair of parallel cylindrical housings having an inner chamber for housing at least one filter means;
    said apparatus having an outlet portion for discharge of a gas or liquid from said chambers, and an inlet portion for receiving a gas or liquid to be decontaminated;
    substantially identical inlet conduits communicating with the inlet of said apparatus;
    substantially identical outlet conduits communicating with the outlets of each of said housings and the outlet of said apparatus;
    valve means in each of said inlet conduits for selectively closing off said inlet conduit to preclude gas or liquid inflow to the respective chamber;
    valve means in each of said outlet conduits for selectively closing of said outlet to preclude gas or liquid inflow so that the gas or liquid will be processed through the open chamber, and
    differential pressure gauge associated with the conduits of each housing, whereby any biologics or chemicals are decontaminated.

11. The apparatus of claim 10 wherein said filters include a contaminant sensing means.

12. The apparatus of claim 10 in combination with a water supply system.

13. The apparatus of claim 10 in combination with a compressed gas system.

14. The apparatus of claim 10 in which said housing includes a HEPA filter.

* * * * *